(12) United States Patent
Chevallier

(10) Patent No.: US 8,099,845 B2
(45) Date of Patent: Jan. 24, 2012

(54) METHOD OF HANDLING AN ARTICLE

(75) Inventor: Stephane Chevallier, Saint-Soupplets (FR)

(73) Assignee: Tech Group Europe Limited, Dublin (IE)

( * ) Notice: Subject to any disclaimer, the term of this patent is extended or adjusted under 35 U.S.C. 154(b) by 0 days.

(21) Appl. No.: 12/897,272

(22) Filed: Oct. 4, 2010

(65) Prior Publication Data

US 2011/0016695 A1 Jan. 27, 2011

Related U.S. Application Data

(62) Division of application No. 10/595,613, filed as application No. PCT/FR2004/002598 on Oct. 13, 2004, now Pat. No. 7,845,056.

(30) Foreign Application Priority Data

Oct. 29, 2003 (FR) ..................................... 03 12643

(51) Int. Cl.
  *B23P 19/04* (2006.01)
(52) U.S. Cl. ................. 29/225; 29/450; 29/559; 29/822; 29/516; 29/517
(58) Field of Classification Search .............. 29/225, 29/450, 559, 252, 282, 822, 516, 517; 523/105, 523/113, 115, 128; 604/530, 22; 138/110, 138/104, 112, 95
See application file for complete search history.

(56) References Cited

U.S. PATENT DOCUMENTS

| | | | |
|---|---|---|---|
| 3,514,843 A | 6/1970 | Cernik | |
| 3,964,539 A * | 6/1976 | Hodler | ........................ 164/303 |
| 4,653,185 A | 3/1987 | Kajima et al. | |
| 4,739,813 A | 4/1988 | Pagani | |
| 4,897,043 A | 1/1990 | Giringer et al. | |

(Continued)

FOREIGN PATENT DOCUMENTS

CH 461183 A 8/1968

(Continued)

OTHER PUBLICATIONS

Int'l Search Report issued on Mar. 9, 2005 in Int'l Application No. WO2005046930.

(Continued)

*Primary Examiner* — Derris Banks
*Assistant Examiner* — Tai Nguyen
(74) *Attorney, Agent, or Firm* — Panitch Schwarze Belisario & Nadel LLP

(57) ABSTRACT

The invention relates to a device (11) for handling an article (13) such as a coil spring, and to an installation for handling an article. The device (11) comprises a body (10) having an internal housing (12) suitable for containing said article (13), said housing (12) presenting at least one open end (10A, 10B) and a constriction zone (14) that is suitable in a stable state, in which said constriction zone (14) presents a reduce dimensions ($D_{14X}$) that is reduced in a first direction (X), for retaining said article (13) inside the body (10), and for being deformed to adopt a deformed configuration enabling said article (13) to be inserted into the housing (12) or enabling said article (13) to be extracted from the housing (12). The installation includes force-application means for acting on the device to change it between its stable state and its deformed configuration.

3 Claims, 4 Drawing Sheets

U.S. PATENT DOCUMENTS

| | | | |
|---|---|---|---|
| 5,822,837 A | 10/1998 | Schwellenbach et al. | |
| 5,845,384 A | 12/1998 | Retzbach | |
| 6,019,793 A | 2/2000 | Perren et al. | |
| 6,024,764 A | 2/2000 | Schroeppel | |
| 6,119,322 A | 9/2000 | Eto | |
| 6,244,253 B1 * | 6/2001 | Haeberer et al. | 123/514 |
| 6,474,572 B1 * | 11/2002 | Tsuchiya et al. | 239/585.1 |
| 6,488,285 B1 | 12/2002 | Allard | |
| 6,626,868 B1 | 9/2003 | Prestidge et al. | |
| 6,764,420 B2 | 7/2004 | Cyr et al. | |
| 6,904,653 B2 | 6/2005 | Bates | |

FOREIGN PATENT DOCUMENTS

| | | |
|---|---|---|
| EP | 0967031 A2 | 12/1999 |
| GB | 2283552 A | 5/1995 |
| SU | 1440808 A1 | 11/1988 |
| WO | 0238304 A1 | 5/2002 |

OTHER PUBLICATIONS

Written Opinion issued on Mar. 9, 2005 in Int'l Application No. WO2005046930.

Int'l Preliminary Report on Patentability issued on Jul. 27, 2006 in Int'l Application No. WO2005046930.

EP Search Report of Jan. 14, 2010 in related EP application No. EP 1 680 257.

* cited by examiner

METHOD OF HANDLING AN ARTICLE

CROSS REFERENCE TO RELATED APPLICATION

This patent application is a divisional of U.S. patent application Ser. No. 10/595,613, filed Oct. 25, 2006, which is a §371 national stage application of International Patent Application No. PCT/FR2004/002598, filed Oct. 13, 2004, which claims priority to French Patent Application No. 03 12643, filed Oct. 29, 2003.

BACKGROUND OF THE INVENTION

The invention relates to a device for handling an article such as a coil spring, to an installation for handling such an article, and to a method of handling such an article. The article in question is a coil spring or more generally an article of elongate shape with a tendency, when stored in bulk with other similar articles, to become tangled together.

Thus, during storage, such articles tangle together with this tendency being further emphasized by the fact that the articles do not always have a stable rest position. For example, a coil spring tends to roll about its own axis when placed on a plane.

When it is desired to make use of an article of the above-specified type, for example in order to mount it in an assembly in which it is to be integrated, it is necessary to begin by separating it from other articles with which it is tangled. Such handling is time-consuming and has a penalizing impact on the cost of producing such assemblies.

BRIEF SUMMARY OF THE INVENTION

The object of the invention is to make it easier to handle articles of the above-specified type, in particular by preventing them from tangling together during storage prior to said handling.

This object is achieved by the fact that the device comprises a body having an internal housing suitable for containing said article, said housing presenting at least one open end and a constriction zone that is suitable, in a stable state in which said constriction zone presents a reduced dimension that is reduced in a first direction, for retaining said article inside the body, and for being deformed to adopt a deformed configuration enabling said article to be inserted into the housing or enabling said article to be extracted from the housing.

Putting the article into place in the device and extracting it therefrom are maneuvers that are simple and fast. After fabrication, a plurality of articles can be stored together with each being placed in a respective device of the invention, and without any risk of the articles tangling during storage. The various articles can be extracted easily from stock for subsequent handling.

Advantageously, the constriction zone in its deformed configuration is in a state that is unstable, such that as soon as the force causing the deformation ceases, the constriction zone returns to its stable state.

Thus, an article that has just been inserted in the body of the device can be held therein merely by releasing the applied force.

The body is preferably of elongate and tubular shape.

Its shape is thus adapted to receive articles that are cylindrical, like most coil springs In its stable state, the constriction zone preferably presents a reduced dimension in a cross-section of said body, so that the inside section of the housing presents variation for holding the article inside the device by pressing at least part of it against a portion of the inside wall.

In its deformed configuration, the constriction zone preferably presents a cross-section that is substantially circular.

The invention also provides an installation handling an article as defined above.

The installation is characterized by the fact that it comprises holder means for holding such a device, and force-application means suitable for acting on said device to deform said constriction zone.

Thus, the handling of articles of the above-defined type can be automated at least in part. The user does not need to handle the device in order to deform the constriction zone.

The installation can be used for inserting and/or extracting a plurality of articles in devices providing it includes article-loading means enabling an article to be inserted and/or article-unloading means enabling an article to be extracted from the device in which said article is housed.

The invention also provides a method of handling an article such as a coil spring.

The method is characterized by the fact that the following steps are performed:

providing a handling device having a body with an internal housing suitable for containing said article, said housing presenting at least one open end and a constriction zone suitable, in a stable state, for retaining said article inside the body, and for being deformed to adopt a deformed configuration enabling said article to be inserted into the housing or enabling said article to be extracted from the housing;

deforming the constriction zone so that it adopts its deformed configuration;

inserting the article into the body while the constriction zone is in its deformed configuration; and causing the constriction zone to return to its stable state in which the article is held inside the body.

Merely deforming the constriction zone thus suffices for placing an article in a device that enables said inserted article to be handled easily.

In analogous manner, in order to extract the article from the device, the constriction zone is preferably deformed so as to adopt its deformed configuration.

In its deformed configuration, the constriction zone is preferably in an unstable state, such that the constriction zone is in its stable state as soon as force is no longer applied thereto in order to deform it.

The invention can be well understood and its advantages appear better on reading the following detailed description of an embodiment of the invention given by way of non-limiting example.

BRIEF DESCRIPTION OF THE SEVERAL VIEWS OF THE DRAWINGS

The description refers to the accompanying drawings, in which.

DETAILED DESCRIPTION OF THE INVENTION

Figure 1:
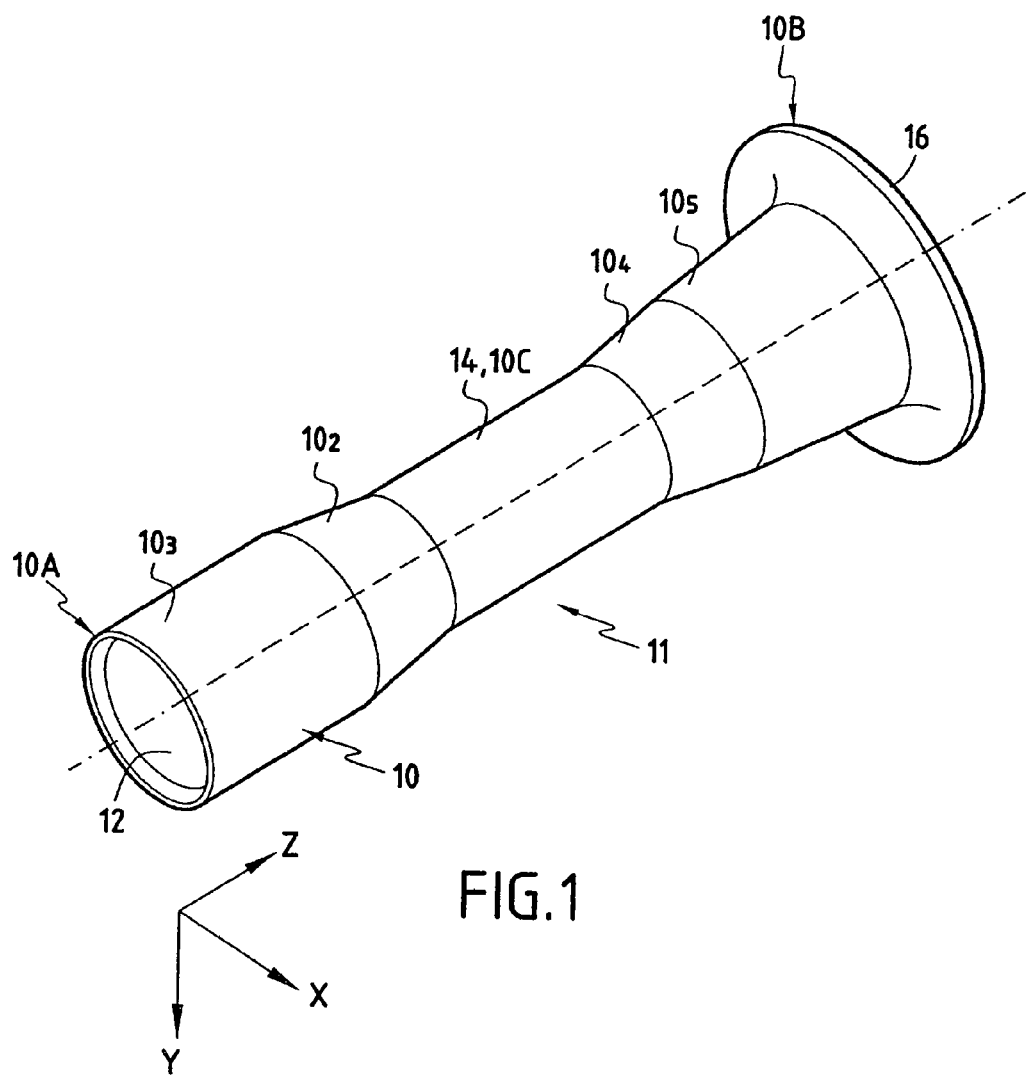
FIG. 1 is a perspective view of a device of the invention.

FIG. 1 is a perspective view of a device 11 comprising a body 10 that is of substantially elongate and tubular shape.

The body 10 extends longitudinal direction Z and is hollow so as to define an internal housing 12 that is substantially elongate along the direction Z. The body 10 presents two ends 10A and 10B respectively that are open so that an article (not shown in FIG. 1) can be housed in the housing 12 and can be inserted therein or extracted therefrom via one of said two ends 10A and 10B.

Figure 2:
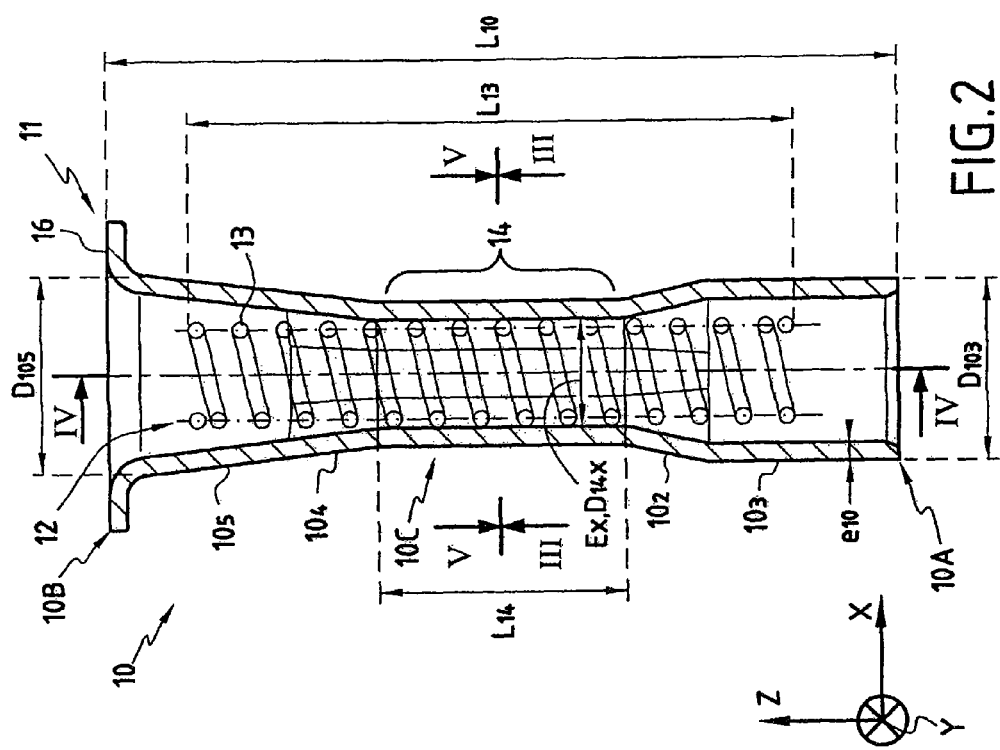
FIG. 2 is a longitudinal section on a first plane of the FIG. 1 device in its stable state.

FIG. 2 is a longitudinal section on a first plane (X, Z) showing the device 11 in its stable state. In this stable state, the device 11 is suitable for retaining an article 13 inside the housing 12.

Referring to FIGS. 1-5, the housing 12 includes a constriction zone 14 which, in the stable state of the device 11, presents a reduced dimension $D_{14X}$ that is reduced in a first direction X. As can also be seen in FIG. 3, the cross-section S14 of the constriction zone 14 is reduced in at least one transverse plane (X, Y) and at least in one direction in said plane, specifically in the direction X. As shown in FIG. 2, the section S14 in this example presents the reduced dimension $D_{14X}$ all along the constriction zone 14.

The reduced dimension $D_{14X}$ is associated with the presence of two closer-together portions 14A and 14B of the wall of the housing 12 in the constriction zone 14, which portions face each other in the direction X. These two closer-together portions 14A and 14B present a spacing EX in the direction X that is of a value that varies depending on whether or not the constriction zone 14 is in its stable state or in its deformed state, which in this example is an unstable state. In the stable state, the spacing EX presents a small dimension equal to the reduced dimension D14X, whereas in the deformed configuration, this spacing EX is larger, as described in greater detail below.

In the constriction zone 14, the housing 12 also presents two farther-apart portions 14C and 14D corresponding to two portions of the housing wall that face each other in the direction Y. These two farther-apart portions 14C and 14D present a spacing EY that varies in a direction Y that is substantially perpendicular to the direction X, depending on the state in which the device is to be found. Thus, in the stable state, the spacing EY presents a long dimension $D_{14Y}$ that is longer than the reduced dimension $D_{14X}$, whereas in the deformed configuration, this spacing EY is shorter than $D_{14Y}$, as described in detail below.

Figure 4:
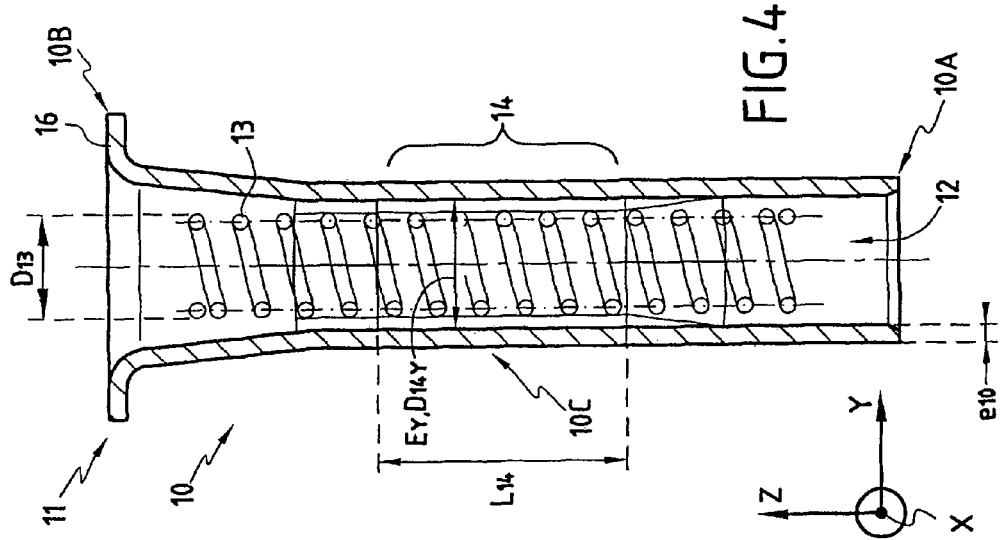
FIG. 4 is a section view of FIG. 2 on line IVIV.

The closer-together portions 14A and 14B and the farther-apart portions 14C and 14D are situated symmetrically respectively about the planes (Y, Z) and (X, Z). FIG. 4 shows the device 11 in section in a second plane (Y, Z) that is substantially perpendicular to the first plane (X, Z).

Figure 3:
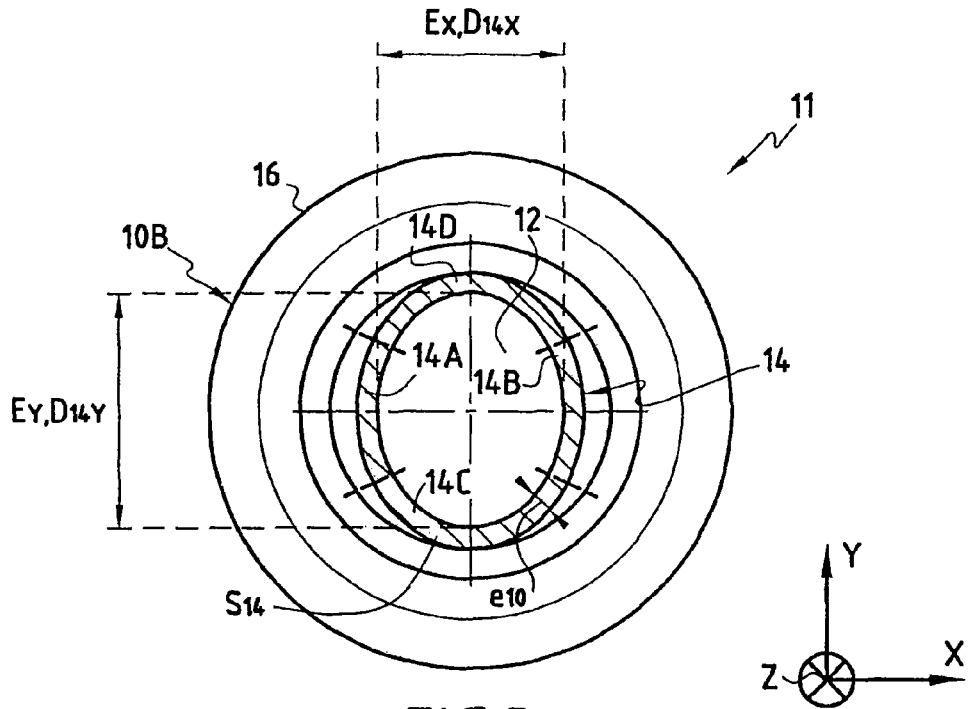
FIG. 3 is a cross-section view of FIG. 2 on line III-III.

In order to retain the article 13 inside the housing 12, the constriction zone 14 presents such closer-together wall portions 14A and 14B and farther-apart wall portions 14C and 14D in at least one of its cross-sections S14. Nevertheless, in order to ensure that the article 13 is held securely in the housing 12, it is preferable, as shown in FIGS. 2 to 4, for the portions 14A to 14D to be present in all of the cross-sections 14C of the constriction zone 14 that extends along a segment of the length of the body 10 that advantageously lies in a central zone 10C of the body 10.

Specifically, in the stable state, the constriction zone 14 presents a cross-section S14 of elliptical shape having its short axis corresponding to the short dimension $D_{14X}$ and its long axis corresponding to the long dimension $D_{14Y}$.

In order to cause the constriction zone 14 to go from its stable state to its deformed configuration in which the article 13 can be inserted into the housing 12 or extracted therefrom, it is necessary for the two closer-together portions 14A and 14B to be spaced apart in order to release a larger space. To do this, said two farther-apart portions 14C and 14D are suitable for being moved towards each other so as to space apart the two closer-together portions 14A and 14B by elastically deforming the constriction zone 14. Since the deformed configuration is an unstable state, as soon as the pressure exerted on the farther-apart portions 14C and 14D is eliminated, the constriction zone 13 returns to its stable state.

In order to present sufficient elasticity to allow such deformation of the constriction zone 14 between its stable and unstable states, it is necessary for the walls of the constriction zone 14 to be resilient. For this purpose, the body 10 is preferably made of a plastics material. The plastics material may be selected appropriately to enable the constriction zone 14 to be deformed elastically repeatedly thus enabling a given device to be used several times. By way of example, the material may be polyoxymethylene (POM).

Figure 5:
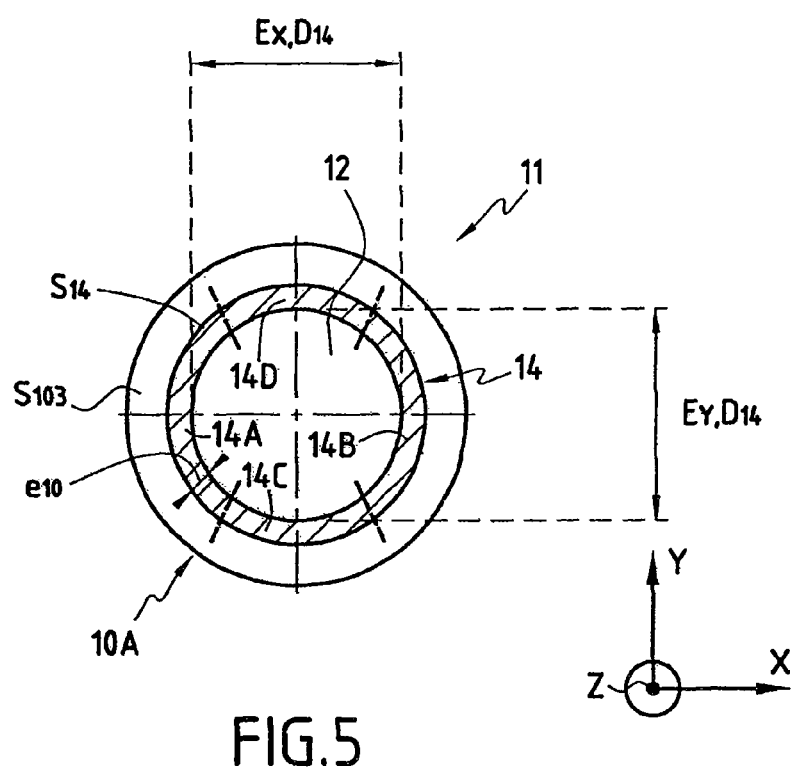
FIG. 5 is a cross-section view corresponding to a section of FIG. 2 on line V-V, with the constriction zone being in its deformed configuration.

As shown in the cross-section of FIG. 5, such deformation of the constriction zone 14 enables the wall portions 14A to 14D to be shaped to occupy a circle of inside diameter D14 having a value that lies between $D_{14X}$ and $D_{14Y}$, thus making the section S14 substantially circular and enabling an article 13 to be passed therethrough.

When the article 13 for handling is substantially cylindrical having an outside diameter D13 as shown in FIGS. 2 and 4, it is preferable for the diameter D14 of the cross-section of the constriction zone in its deformed configuration to be greater than or equal to the diameter D13. It follows that the reduced dimension $D_{14X}$ needs to be smaller than the diameter D13 and the long dimension $D_{14Y}$ needs to be greater than or equal to said diameter D13.

Thus, for example when the article 13 is of the coil spring type having an outside diameter D13 substantially equal to 10 millimeters (mm), the device 11 should be such that in its stable state it represents a constriction zone 14 having a short dimension $D_{14X}$ that is substantially equal to 9 mm and a long dimension $D_{14Y}$ that is substantially equal to 11.5 mm, and in its deformed configuration, it should present a circular section S14 of diameter D14 substantially equal to 11 mm. By way of example, the wall thickness e10 of the body 10 of said device 11 is equal to 1 mm.

The outside shape of the body of the device may be cylindrical, for example having an outside diameter substantially equal to the long dimension $D_{14Y}$ plus the thickness of the body, in which case the constriction zone is masked in the wall thickness of the body without affecting its outside shape.

Nevertheless, as shown in the figures, it is possible to make provision for the constriction zone 14 to be visible by causing the outline of the body 10 to vary so, as to make it easier to identify the zone that is to be deformed, in particular when deformation is performed manually. In addition, varying the outside shape of the body 10 makes it possible to keep a constant thickness e10 for its walls over their entire length, thereby making the device easier to make, in particular when such devices are made by molding a plastics material.

Thus, the body 10 of the device 11 may present the constriction zone 14 in its central zone 10C over a length L14 that corresponds substantially to one-third of the total length L10 of the body 10. For example, for a spring 13 having a length L13 that is substantially equal to 55 mm, the device 11 should have a length L10 that is longer than that of the spring, being substantially equal to 65 mm, and presenting a constriction zone of length L14 substantially equal to 20 mm.

The outside shape of the body 10 may be caused to vary progressively between the constriction zone 14 and 25 each of the ends 10A and 10B in order to return in the plane (X, Z) to the spacing between the short dimension $D_{14X}$ and the long dimension $D_{14Y}$, plus the thickness e10 the body 10.

The body can thus be symmetrical about its central zone 10C, or on the contrary, and as shown in FIGS. 1, 2, and 4, it may be asymmetrical about the central zone 10C. The body 10 shown in FIGS. 1, 2, and 4, has a collar 16 at its end 10B, and between its ends 10A and 10B there can be seen five wall zones presenting outlines that are particular. Preferably, an article is inserted into the body 10 of the device 11 as shown in the drawings via its ends 10B, while an article is preferably extracted through its end 10A, as described in detail below.

A first zone corresponds to the constriction zone 14 and forms the above-mentioned central zone 10C. This first zone 14 thus presents an outline of elliptical shape as described above for its cross-section and while it is in a stable state.

A second zone $10_2$ extends from said central constriction zone 14 towards the end 10A. A third zone $10_3$ extends from said intermediate second zone $10_2$ to the end 10A. As shown in FIG. 5, in this third zone $10_3$, the body 10 presents a cross-section $S_{103}$ that is substantially circular, of diameter $D_{103}$ that is constant along the axis Z, and that is substantially equal (ignoring the thickness e10) to the long dimension $D_{14Y}$. The second zone $10_2$ is an intermediate zone that varies the of the elliptical outline of and the circular outline progressively between constriction zone 14 third zone $10_3$.

At the other end, a fourth zone $10_4$ extends from the central constriction zone 10C towards the end 10A that presents the collar 16. A fifth zone $10_5$ extends from said intermediate fourth zone $10_4$ to the end 10A. The outline of the fifth end $10_5$ flares going towards the end 10A. This fifth zone $10_5$ presents a cross-section that is substantially circular, of diameter $D10_5$ that decreases along the axis Z on going towards the constriction zone 14 where it reaches a value that is equal to the small dimension $D_{14X}$ (ignoring the thickness 30 e10). The fourth zone 104 is an intermediate zone that varies between the outline of the elliptical constriction zone 14 and the outline of the fifth zone $10_5$ which is of circular section, as can be seen in FIGS. 2 and 4.

Between the constriction zone 14 and its open end(s), the housing advantageously presents a portion that flares towards the corresponding end in order to make it easier to insert an article 13 into the housing 12. Specifically, this is the above-described fifth zone $10_5$.

The device can be used for holding and storing an article of the spring type. Insertion and extraction are performed in the same manner by applying a deforming force to the constriction zone. It suffices to compress the outline of the constriction zone 14 at least in the second direction Y (see FIG. 3) to move apart the closer-together portions 14A and 14B and to move towards each other the farther-apart portions 14C and 14D. This operation can be performed manually or automatically using an installation as described below.

FIG. 5 is a diagram showing an installation of the invention. The installation has first feeder means 18 for feeding a plurality of devices 11, and second feeder means 20 for feeding a plurality of articles 13. Specifically, the first feeder means 18 are of known type and may be constituted, for example, by a preferably sloping chute 18 adapted to co-operate with the devices 11 by supporting them via their collars 16. The devices II, in their stable state, are preferably driven by gravity along the chute 18 so as to be brought progressively into register with the second feeder means 20. When the chute is not inclined, then a conveyor type 25 belt can be provided for moving the devices.

The installation also includes holder means for holding a device 11 so that its end 10B is indeed in register with the second feeder means 20. By way of example, the holder means may comprise a system 22A for 30 stopping the collar of the device 11 in a determined position, which system 22A may be constituted by a moving abutment suitable for being placed across the chute 18 or for being moved away therefrom. When a device 11 is in this position, its constriction zone 14 can be deformed by force-application means 24 suitable for compressing the device 11. By way of example, these force application means 24 can be constituted by two 11 semicircular ring portions suitable for being clamped around the outline of the device 11 in its constriction zone 14 so as to apply a pressure force against the farther-apart walls 14C and 14D in order to move apart the closer-together walls 14A and 14B.

The installation can include loader means 26 for loading articles that enable an article, e.g. a coil spring 13, to be inserted, to be inserted into a device 11. Specifically, the loader means 26 comprise the first and second feeder means 18 and 20, the means for holding the device in place, and the above-identified described force application means 24. When the device has two open ends 10A and 10B, as described above, it is preferable for the holder means further to include means for temporarily closing the end 10A of the body 10 remote from its end through which an article is inserted, serving to prevent the article dropping out in undesired manner at the moment it is inserted into the housing 12 while its constriction zone 14 is in its circular configuration.

Figure 6:
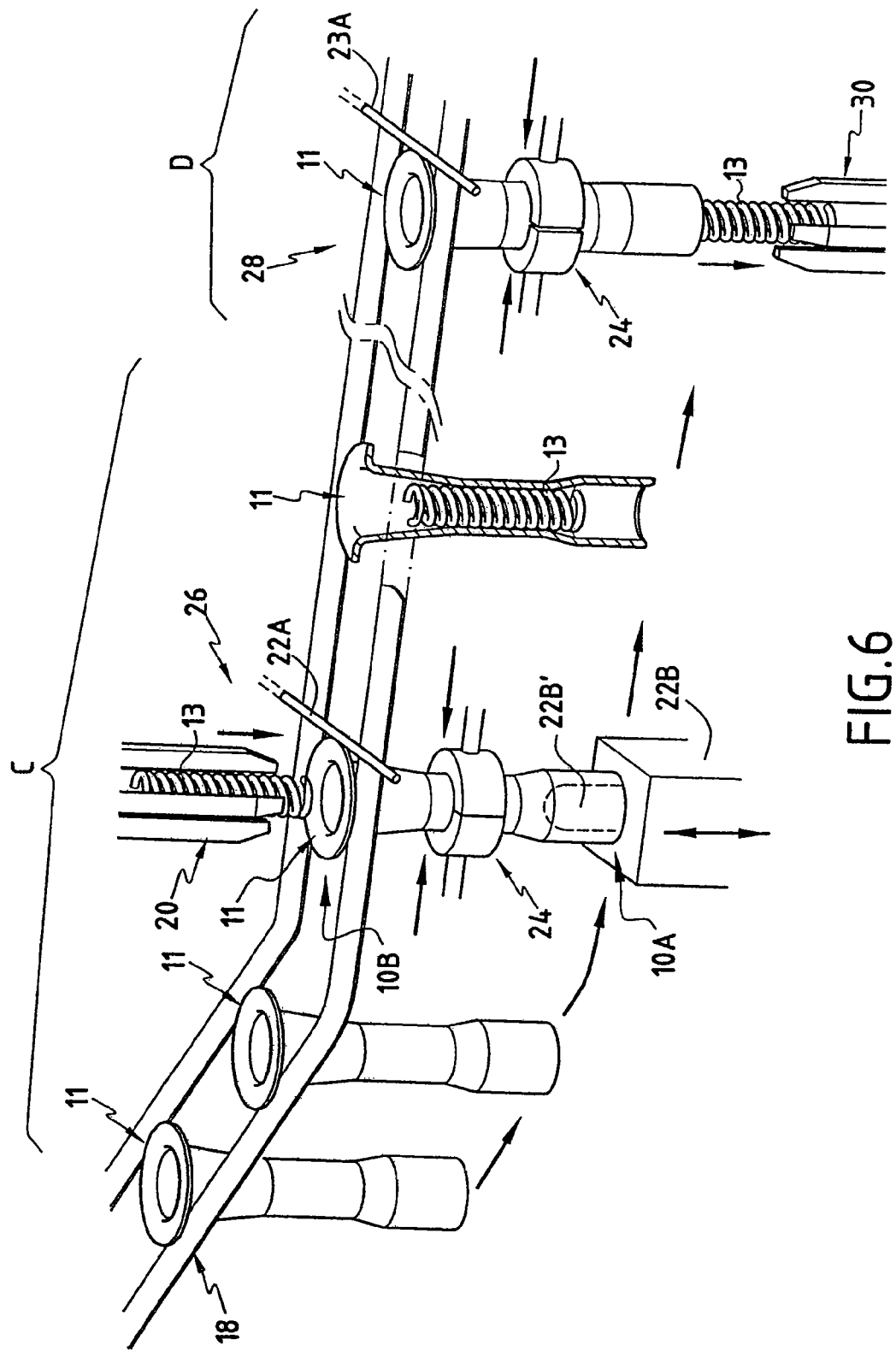
FIG. 6 is a diagram of an installation of the invention.

These closure means may be formed by a reciprocating part 22B. As shown in FIG. 6, the part 22B advantageously comprises a centering head 22B' suitable for inserting into the body via its end 10A so as to center the spring 13, at least lengthwise.

Once the spring 13 is in place, the force application means 24 are deactivated so as to release the pressure exerted on the constriction zone 14, and the device 11 returns to its stable state; as a result the spring 13 is held in the housing 12 of the device via the closer-together portions 14A and 14B. A plurality of devices each containing a respective spring can then be stored and handled easily.

In order to enable a spring to be placed automatically in an assembly into which it is to be integrated, the installation may include unloader means 28 for unloading articles that enable the coil spring 13 to be extracted from the device 11. The unloader means 28 comprise means for holding the device 11, e.g. a system 23A analogous to the system 22A for holding the device in position, and the compression means 24 as described above.

When possible, the assembly into which the spring is to be integrated can be positioned directly in register with the end 10A so that the spring 13 is put into place directly. Otherwise, the unloader means 28 may further include conventional removal means 30, e.g. a chute 30.

Thus, once the device 11 has been deformed by the force-application means 24 so as to move into its unstable state, the spring 13 is no longer held in the housing 12 of the device and can be recovered for putting into place in an assembly into which it is to be integrated.

The loader portion C of the installation may be located for example at a site where the articles 13 are manufactured. These articles 13 each contained in a corresponding device 11 can then be transported to an assembly site which includes the unloader portion D of the installation.

The invention claimed is:

1. A method of handling an article such as a helical spring, the method being characterized in that the following steps are performed:
 (a) providing a handling device having a body with an internal housing suitable for containing said article, said housing presenting at least one open end and a constriction zone suitable, in a stable state in which said constriction zone presents a reduced dimension that is reduced in a first direction, for retaining said article inside the body, and for being deformed to adopt a deformed configuration enabling said article to be introduced into the housing or enabling said article to be extracted from the housing;
(b) deforming the constriction zone so that it adopts its deformed configuration;
(c) inserting the article into the body while the constriction zone is in its deformed configuration; and
(d) causing the constriction zone to return to its stable state in which the article is held inside the body.

2. A method according to claim 1, characterized in that in order to extract the article from the device, the constriction zone is deformed so that it adopts its deformed configuration.

3. A method according to claim 1, characterized in that the constriction zone in its deformed configuration is in a state that is unstable.

* * * * *